United States Patent [19]

Moody et al.

[11] Patent Number: 5,008,089
[45] Date of Patent: Apr. 16, 1991

[54] RECOVERY OF ALUMINA FROM BAUXITE

[75] Inventors: Gillian M. Moody, Brighouse; Christine A. Rushforth, Bradford, both of England

[73] Assignee: Allied Colloids Limited, Great Britain

[21] Appl. No.: 421,165

[22] Filed: Oct. 13, 1989

[30] Foreign Application Priority Data

Oct. 14, 1988 [GB] United Kingdom ............... 8824176

[51] Int. Cl.$^5$ .................................................. C01F 7/06
[52] U.S. Cl. ........................................ 423/121; 209/5; 210/727; 210/730; 210/733; 210/734
[58] Field of Search ................... 209/5; 210/725, 727, 210/728, 734, 730, 733; 423/111, 121, 122

[56] References Cited

U.S. PATENT DOCUMENTS

| 3,085,853 | 4/1963 | Lesinski et al. | 23/52 |
| 3,397,953 | 8/1968 | Galvin et al. | 23/143 |
| 3,445,187 | 5/1969 | Sibert | 210/733 |
| 3,541,009 | 11/1970 | Arendt et al. | 210/52 |
| 3,681,012 | 8/1972 | Sibert | 23/143 |
| 3,755,531 | 8/1973 | Tsukawaki et al. | 423/121 |
| 3,975,496 | 8/1976 | Smalley et al. | 423/122 |
| 4,545,902 | 10/1985 | Connelly et al. | 210/734 |
| 4,608,237 | 8/1986 | Roe et al. | 423/121 |
| 4,767,540 | 8/1988 | Spitzer et al. | 210/728 |
| 8,789,485 | 12/1988 | Field et al. | 423/121 |
| 8,390,959 | 7/1968 | Sibert | 210/733 |

FOREIGN PATENT DOCUMENTS 825234 10/1969 Canada .
1154993 6/1969 United Kingdom .

OTHER PUBLICATIONS

"Synthetic Flocculant Technology in the Bayer Process" by L. J. Connelly et al., Nalco Chemical Company, pp. 61-68.

Primary Examiner—Peter Hruskoci
Attorney, Agent, or Firm—Ostrolenk, Faber, Gerb & Soffen

[57] ABSTRACT

Red mud in Bayer process liquors are flocculated using dextran and synthetic anionic polymer in the same stage, usually added separately to the liquor. The liquor may be the primary settler slurry, the secondary clarification liquor or one or more of the red mud washing stages. The process is of particular advantage where the liquors are high in carbonate content and/or total alkalinity.

15 Claims, No Drawings

RECOVERY OF ALUMINA FROM BAUXITE

The Bayer process for recovering alumina from bauxite is well known and comprises digesting the bauxite in an aqueous alkaline liquor that acquires a sodium aluminate content, and the insoluble residue is separated in a primary settler stage from the digestion liquor as red mud.

The red mud is then washed in a plurality of sequential wash stages in each of which the red mud is washed with a wash liquor from a later wash stage, flocculated with a flocculating agent and separated from the wash liquor. The washed red mud is then washed in a final wash stage with a final wash liquor, flocculated with a final flocculating agent, and settled. The overflow (i.e. liquor) from the primary settler can be separately treated in a secondary clarification stage to remove any residual suspended solids before aluminum trihydrate is recovered.

Lime has been added to the primary settler stage in order to react with the liquor to reform sodium hydroxide, which can then be reused in the digestion. Also, in some work that we have conducted we have added lime to the first washer stage for the same purpose, since the liquor from the first washer stage is passed back to the primary digester.

The flocculating agents are used to improve the flocculation process in each stage, for instance by increasing the rate of settling, improving the clarity of the supernatant liquor (by reducing residual suspended solids) and/or increasing the density of the settled solids.

The flocculating agents that were initially used in this process, for instance during the 1960's, were usually polysaccharides, for instance starch. At about that time, it was also proposed specifically to use dextran as the flocculating agent (see examples 1 and 2 of U.S. Pat. No. 3,085,853). Dextrans modified by reaction with polyphosphates to give increased viscosity and improved flocculation have also been proposed for use in red mud separation in GB-A-1154993.

Subsequently however the naturally occurring polymers have been replaced by synthetic flocculating agents which are generally water soluble polymers of one or more ethylenically unsaturated monomers. Blends of synthetic polymers and starches have also been suggested as red mud flocculants in U.S. Pat. No. 3,397,953 and U.S. Pat. No. 3,541,009. In U.S. Pat. No. 4,767,540 red mud is flocculated by using as flocculants, a hydroxy animated synthetic polymer and a conventional flocculant, which can be starch or a synthetic polymer. The components can be added as a blend or separately in either order.

The synthetic flocculating agents are usually anionic and it is known that the optimum anionic content, for optimum settling, is usually related to the alkalinity of the wash liquor, with the early wash liquors (having the highest alkalinity) requiring more highly anionic polymers than the later wash liquors. In order to select, in advance, an anionic polymer that is likely to be suitable for a particular washer stage, it is therefore convenient to measure the alkalinity (for instance expressed as NaOH or as $Na_2O$) and then select the anionic content according to the measured alkalinity, with the highest values of alkalinity requiring the highest anionic content.

For instance optimum settlement is often achieved in the early wash liquors (which have the highest alkalinity) using sodium or ammonium polyacrylate homopolymer or a copolymer with, for instance, 10% acrylamide whereas optimum settlement is usually achieved in the later wash liquors (having lower alkalinity) using copolymers of sodium or ammonium acrylate and, for instance, 50% by weight acrylamide. In U.S. Pat. No. 4678585, in the early wash liquors highly anionic polyacrylate or alternatively starch is used as the flocculant and in the later wash stages a 50% acrylate 50% acrylamide copolymer is used.

The red mud from the final wash stage is often settled in lagoons but it can be, for instance, settled while flowing down a mud stack.

It is, of course, desirable that the settled red mud from the final stage should be as dense as possible and should contain a minimum of liquor. This has the advantage of minimizing the amount of aqueous alkaline liquor that can escape into the environment (since the liquor that separates relatively quickly during the settling can be reused as a wash liquor). Also the increased density can facilitate the handling or flow properties of the mud. This is particularly important during the mud stacking process since if the settled mud contains too much liquor the mud will have a viscosity that is too low for satisfactory stacking.

Despite the accepted desirability, from the point of view of flocculation performance, to use a flocculant of medium anionic content in the later stages, it has become found that in some instances the use of such a material in the final wash stage tends to lead to a mud that, after settlement, has a density that is too low, especially for mud stacking. Although the alkalinity of the wash liquor in the final stage is relatively low, thus suggesting the use of a polymer of relatively low anionic content, it has been found that some improvement in mud density can be achieved if the final flocculant is much more highly anionic than would be indicated by the alkalinity of the final wash liquor, for instance being sodium polyacrylate homopolymer. However the results are still rather unsatisfactory even when using this material.

We have also found that there are other instances where the flocculation performance of an anionic polymer is worse than would be expected having regard to its anionic content and the total alkalinity of the liquor.

We have now surprisingly found that it is possible to obtain significant improvements in the flocculation performance in the primary settlement, secondary clarification and/or wash stages.

Flocculants are also used in other stages of the Bayer process, for instance in the aluminum trihydrate recovery step where flocculants can increase the rate of settlement of the crystals. In CA-A-825234 a blend of a dextran and an anionic salt, which can be poly(styrene sulphonate) is used to flocculate aluminum trihydrate.

In a Bayer alumina recovery process according to the invention, bauxite is digested in an aqueous alkaline liquor and the resultant red mud is flocculated with a flocculating agent and separated from the digestion liquor in a primary separation stage, the overflow liquor of which is optionally subjected to a secondary clarification stage in which further suspended red mud particles are flocculated and separated from the liquor, and the red mud from the primary separation stage and, if present, optionally also the secondary clarification stage is then washed in a plurality of sequential wash stages in each of which the mud is washed with a wash liquor, flocculated with a flocculating agent and separated from the wash liquor, and the flocculating agent in at least one stage selected from the primary separation stage, secondary clarification stage and the wash stages comprises two components, and the process is characterized in that the two components are a) a dextran and b) a synthetic anionic polymeric flocculant.

Preferably components a and b are added sequentially, although sometimes beneficial results may be achieved if they are preblended and then added to the liquor.

Although the dextran can be mixed into the liquor that is being treated with the synthetic polymer it is preferred to mix the polysaccharide into the liquor before the synthetic polymeric flocculant is mixed into the liquor. A deliberate time interval can be left between the two additions but generally the polysaccharide is mixed into the liquor and, substantially as soon as this mixing is completed, the synthetic polymeric flocculant is then mixed into the liquor. It is found that better results are achieved if the dextran is vigorously mixed into the liquor and if the synthetic polymer is mixed less vigorously. It appears possible that the polysaccharide is acting as a coagulant.

The dextran should be water soluble and will generally have a molecular weight of at least 50,000 although values in the range 500,000 up to 10 million can be preferred. The dextran preferably is a microbially produced polysaccharide and has a preponderance of glucose units joined together through 1:6 glucocide linkages. Suitable materials are described in U.S. Pat. No. 3,085,853. Dextran derivatives, such as the polyphosphates described in GB-A-1154993 or dextran sulfates mentioned in CA-A-825234, can also be used. The dextran can be supplied in the form of dry particulate solid, for instance which has been recovered from a microbial suspension. Often the final step of the purification may be a spray drying step in which other components may have been added to aid processing. In general such processing aids do not need to be removed from the dextran prior to its use as a flocculant. The dextran is usually dissolved into water or alkaline plant liquor before addition to the liquor in the process of the invention.

The synthetic polymeric flocculant is generally a high molecular weight water soluble polymer formed from anionic ethylenically unsaturated monomer optionally with non-ionic ethylenically unsaturated monomer.

The anionic monomer is generally a monoethylenically unsaturated carboxylic or sulfonic acid which is usually acrylic acid but can be, for instance, methacrylic acid, (meth)allyl sulfonic acid, vinyl sulfonic acid or 2-acrylamido methyl propane sulfonic acid. The anionic monomer is generally present in the form of a sodium or other alkali metal or ammonium salt.

The non-ionic monomer, if present, is usually acrylamide but other non-interfering monomers may be included in known manner. For instance a minor amount of methylol acrylamide units may be included, e.g., as described in U.S. Pat. No. 3,975,496.

The optimum amount of anionic units depends in part on the total alkalinity of the liquor and, as previously, it is generally desired to use a polymer having a high anionic content (for instance 100% or possibly down to 80 to 90% by weight) in the primary separation stage, and polymers of possibly lower alkalinity, for instance down to 20%, in the final stage, with intermediate values for intermediate stages. Depending upon the alkalinity of the particular liquor and the other conditions of the process, the polymer is generally a polymer of 20 to 100%, usually 50 to 100% anionic monomer (usually sodium acrylate) with the balance being acrylamide. In the primary separation stage and in the first wash stage the polymer is generally formed from 80 to 100% anionic monomer but in the final stage it can be typically formed from, for instance, 40 to 75% anionic monomer with the balance being acrylamide.

The synthetic polymer may be supplied as a reverse phase dispersion but preferably it is supplied as a gel or bead polymer, for instance as a powder, which is dissolved into water or plant liquor before use.

Although the incorporation, generally as a pre-treatment, of the flocculant combination including dextran is advantageous in at least one stage in a wide variety of processes, we have found that it is particularly advantageous in a stage where the flocculation performance is worse than would be expected, having regard to the alkalinity of the liquor and the anionic content of the polymer. We have now established that the flocculation performance does not, despite all the prior belief, depend primarily upon total alkalinity but instead depends heavily upon the chemical type of alkalinity as well as upon the total alkalinity. In particular, we now realize that the presence of sodium carbonate in significant amounts detrimentally affects flocculation performance when the flocculant is entirely a synthetic anionic polymeric flocculant. However this detrimental effect can be reduced or overcome by the treatment with the dextran or polysaccharide, and in particular by the pretreatment with dextran. Thus the invention is of particular value when the dextran or polysaccharide is included in a liquor that has a relatively high sodium carbonate content.

This liquor can be the primary settlement liquor. Lime may also have been added to this liquor, in order to regenerate sodium hydroxide from the liquor, ready for reuse in the digestion process. The presence of dextran in the very high caustic liquor that prevails in the primary settlement stage in combination with a homopolymer of, for instance, sodium acrylate is particularly preferred.

Alternatively or additionally the liquor may be the secondary clarification liquor. Lime may have been added prior to this stage.

In other preferred processes the dextran and synthetic polymer are added to the wash liquor in one or more of the wash stages, and if desired they can be included in two or more of the primary separation stage, secondary clarification stage and wash stages. If desired, they can be included in the wash liquor for each of the wash stages.

Irrespective of the particular stage, the improvement in flocculation performance is demonstrated by, for instance, improved clarity and therefore reduced suspended solids in the supernatant liquid and/or improved rate of settlement and/or improved solids density of the red mud, at any particular dosage of synthetic flocculant and anionic content of the synthetic polymer.

The amount of dextran that is added is usually 0.2 to 10, preferably 0.5 to 5, mg/l and is usually from 10 to 150%, preferably 25 to 100%, of the amount of synthetic polymer. The amount of synthetic polymer depends, inter alia, on its anionic content and molecular weight (which is usually above 0.5 million and preferably above 1 million) but is usually in the range 0.5 to 20, preferably 1 to 10, mg/l.

The alkalinity of the wash liquor can range from, for instance, 10 to 300 g/l, expressed as sodium hydroxide. When, as is often preferred, the combination is used in the more caustic liquors the alkalinity typically is in the range 100 to 300, often 200 to 300, g/l expressed as sodium hydroxide. The invention is of particular value when the sodium carbonate content of the liquor is at least 10 g/l, often at least 20 g/l and especially when it is more than 50 g/l. The carbonate content can be up to 100 g/l or even higher but is usually less than 200 g/l.

The solids content of the red mud in the liquor (digestion liquor or wash liquor) that is being flocculated is generally above 10 g/l but below 100 g/l. Often it is in the range 20 to 50 g/l.

The overall process can, apart from the flocculant combination addition, be conventional. Thus the digestion is typically conducted using hot (e.g., 100° C.) alkaline digestion liquor typically having an alkalinity of 150 to 250 g/l Na$_2$O, to form a liquor containing sodium aluminate from which aluminum hydroxide is precipitated. Lime can be added to convert sodium carbonate back to sodium hydroxide and the resultant liquor recycled. Separation of the liquor from the insoluble components in any of the stages where the dextran/synthetic polymer combination is not used is promoted by the inclusion of a flocculant that can be a polysaccharide but is usually a polymer of sodium acrylate (or other anionic ethylenically unsaturated monomer) with 0 to 20 weight percent, usually 0 to 10% acrylamide.

As described briefly above, the red mud from the primary settler stage is taken to a first wash stage where it is washed with a wash liquor, flocculated with a flocculating agent, separated from the wash liquor, and passed to the second wash stage. The wash liquor that is separated in the first stage is generally passed to the digestion stage and the wash liquor that is used in the first stage is generally recovered from the second stage. The process is generally repeated through a series of, in total, 4 to 10 wash stages, often 5 to 7 wash stages, prior to the final wash stage described above. The washed mud from this is settled in a mud stack, lagoon or any other convenient position, with the supernatent liquor from the settlement generally being recycled for use as part or all of the final wash liquor.

Lime can also be included in the digestion or wash liquor to improve further the flocculation performance at any particular dosage of dextran and synthetic polymer, for instance in the primary separation stage or in the wash liquor.

The following examples illustrate the invention in greater detail.

EXAMPLE 1

In each test a slurry was made up to 25 g/l red mud solids in an aqueous solution of sodium hydroxide or sodium hydroxide and sodium carbonate, as specified, and the slurry was then flocculated by the addition of high molecular weight sodium polyacrylate homopolymer in the specified dosage, optionally after pre-treatment with dextran in the specified dosage. Dosages were in mg/l. Settlement rates were recorded in cm/min, where the highest rate is generally preferred, and clarity was recorded on a scale where the higher number indicates improved clarity, and underflow solids were recorded as percentages, where again the higher numbers indicate improved values. The results are given in the following table.

TABLE 1

| NaOH g/l | Na$_2$CO$_3$ g/l | Dextran mg/l | Polymer mg/l | Settlement Rate | Clarity | Underflow Solids % |
| --- | --- | --- | --- | --- | --- | --- |
| 243 | — | — | 3 | 36.3 | Poor | |
| 243 | — | — | 4 | 65.4 | Fair | |
| 243 | — | — | 5 | 80.0 | Fair | |
| 243 | — | — | 6 | 88.8 | Fair | |
| 243 | — | 3 | 3 | 78.1 | Good | |
| 200 | 50 | — | 3 | 10 | 3 | 18.1 |
| 200 | 50 | — | 4 | 20 | 3 | 18.7 |
| 200 | 50 | — | 5 | 30 | 3 | 19.4 |
| 200 | 50 | 1 | 3 | 32.6 | 8 | 21.2 |
| 200 | 50 | 2 | 3 | 62.5 | 15 | 22.3 |
| 200 | 50 | 3 | 3 | 68.5 | 18 | 22.3 |
| 200 | 50 | 4 | 3 | 78.9 | 22 | 22.3 |
| 200 | 50 | 1 | 4 | 58.8 | 11 | 23.1 |
| 200 | 50 | 2 | 4 | 64.8 | 16 | 23.1 |
| 200 | 50 | 3 | 4 | 81.1 | 19 | 22.7 |
| 200 | 50 | 4 | 4 | 78.9 | 20 | 21.2 |

This clearly demonstrates the benefit of the addition of dextran.

EXAMPLE 2

A synthetic primary settler feed liquor was made up comprising 25 g/l red mud solids and 200 g/l sodium hydroxide. For each test 500 ml of the slurry was placed in a 500 ml measuring cylinder and placed in a water bath at 80° C. The appropriate dose of dilute flocculant (made up in 0.1M sodium hydroxide solution) was added and mixed using a predetermined number of plunges of a stainless steel plunger. In the case of two-component flocculant additives added separately these are each added separately, mixing being carried out after each addition using the same number of plunges. The order of addition is given in Table 2.

The rate of settlement of the solids was recorded between two fixed points on the cylinder. After 10 minutes a sample of the supernatent was removed and tested for its clarity. This was carried out by placing the sample into a wedge shaped transparent vessel having its thin end pointing downwards and having a vertical back surface marked with a sequence of numbers which increased with the thickness of the wedge and thus with the distance through the liquid in a horizontal direction. The highest number which can be read clearly when the rear face of the vessel is viewed horizontally through the liquid is reported in the table. Higher numbers indicate better clarity and are thus desirable.

The dextran used was added with an equal amount of sodium tripolyphosphate. The synthetic polymer was a high molecular weight sodium acrylate homopolymer (PSA).

TABLE 2

| Flocculant/order | Dose mg/g | Settlement rate cm/min | Clarity |
| --- | --- | --- | --- |
| PSA | 1 | 1 | 2 |
| | 2 | 21 | 3 |
| | 3 | 44 | 5 |
| | 4 | 57 | 6 |
| Dextran | 0.5 | 2 | 6 |
| | 1.0 | 6 | 8 |
| | 1.5 | 11 | 6 |
| | 2.0 | 13 | 6 |
| PSA/Dextran 2:1 blend | 0.75 | 1 | 4 |
| | 1.5 | 9 | 4 |
| | 2.25 | 26 | 5.5 |
| | 3.0 | 29 | 5 |

TABLE 2-continued

| Flocculant/order | Dose mg/g | Settlement rate cm/min | Clarity |
| --- | --- | --- | --- |
| PSA + Dextran | 2 + 1 | 39 | 5.5 |
|  | 2 + 2 | 40 | 17 |
| Dextran + PSA | 1 + 1 | 40 | 8 |
|  | 2 + 2 | 60 | 27 |

The results show that for a slurry where the alkalinity is solely due to sodium hydroxide, the combination of dextran with poly(sodium acrylate) gives surprisingly improved settlement rates. When the components are added separately with mixing of the first component into the slurry before addition of the second component the increase in settlement rate is even better, especially when the dextran is added first. Higher amounts of dextran gives particularly good clarity results.

EXAMPLE 3

The procedure of example 2 was repeated using a slurry containing 205 g/l sodium hydroxide and 50 g/l sodium carbonate. The results are reported in Table 3.

TABLE 3

| Flocculant + order | Dose mg/l | mixing (no. plunges) | Settlement rate cm/min | Clarity |
| --- | --- | --- | --- | --- |
| Dextran + PSA | 0.5 + 3 | 3 + 3 | 52 | 5 |
|  | 1.0 + 5 | 3 + 3 | 68 | 8 |
|  | 1.5 + 3 | 3 + 3 | 71 | 11 |
|  | 2.0 + 3 | 3 + 3 | 69 | 9 |
| PSA + Dextran | 3 + 0.5 | 3 + 3 | 51 | 5 |
|  | 3 + 1.0 | 3 + 3 | 51 | 5 |
|  | 3 + 1.5 | 3 + 3 | 55 | 6 |
|  | 3 + 2.0 | 3 + 3 | 60 | 6 |

The results show that for slurries where there is a high carbonate content it is preferred for the dextran to be added first. The settlement rate and clarity are both improved in such tests.

EXAMPLE 4

Example 3 was repeated but the effect of the degree of mixing of each of the components was investigated by varying the number of plunges after each addition. The results are reported in Table 4.

TABLE 4

| Flocculant + order | Dose mg/l | mixing (no. plunges) | Settlement rate cm/min | Clarity |
| --- | --- | --- | --- | --- |
| Dextran + PSA | 1.5 + 3 | 3 + 1 | 84* | 9 |
|  | 1.5 + 3 | 3 + 3 | 62 | 8 |
|  | 1.5 + 3 | 3 + 6 | 48 | 9 |
| PSA + Dextran | 3 + 1.5 | 3 + 1 | 51 | 4 |
|  | 3 + 1.5 | 3 + 3 | 59 | 6 |
|  | 3 + 1.5 | 3 + 6 | 59 | 12 |

*No distinct mud line

The results show that it is beneficial for the dextran to be mixed into the slurry more vigorously than the polyacrylate. Increased mixing of the dextran appears to give improved settlement and clarity. Increased mixing of polyacrylate on the other hand appears to give a decreased rate of settlement, although inadequate mixing gives an indistinct mud line which is disadvantageous.

EXAMPLE 5

The procedure of example 2 was repeated using a slurry containing 205 g/l sodium hydroxide and 50 g/l sodium carbonate. Where a two component flocculant system was used the dextran was always added first, mixed in and then synthetic polymer was added. In this example some of the slurries also had an addition of lime. The results are shown in Table 5.

TABLE 5

| Dextran dose mg/l | PSA dose mg/l | lime g/l | settlement rate cm/min | clarity |
| --- | --- | --- | --- | --- |
| 1.5 | — | — | 8 | 8 |
| 2 | — | — | 10 | 8 |
| 1.5 | — | 5 | 8 | 12 |
| 2 | — | 5 | 10 | 14 |
| — | 3 | — | 10* | 3 |
| — | 4 | — | 20* | 3 |
| — | 3 | 2 | 18* | 6 |
| — | 4 | 2 | 21* | 6 |
| — | 3 | 5 | 30 | 7 |
| — | 4 | 5 | 49 | 7 |
| 1 | 3 | — | 63 | 15 |
| 2 | 3 | — | 79 | 22 |
| 1 | 4 | — | 65 | 16 |
| 2 | 4 | — | 79 | 20 |
| 1 | 3 | 1 | 57 | 16 |
| 2 | 3 | 1 | 60 | 27 |
| 1 | 3 | 2 | 55 | 17 |
| 2 | 3 | 2 | 60 | 24 |
| 1 | 4 | 2 | 63 | 15 |
| 2 | 4 | 2 | 79 | 25 |

*No distinct mud line formed which is very undesirable.

These results show that for slurries having high carbonate contents neither dextran nor sodium polyacrylate give adequate results alone, in particular synthetic polymer alone gives very poor settlement. The addition of lime improves the results in each case to an extent, although even high amounts of lime still do not give sufficiently good clarities or rates of settlement.

The combination of dextran and poly(sodium acrylate) gives greatly improved rates of settlement and supernatant clarity, higher amounts of dextran giving better results for both factors. The incorporation also of lime gives further improvement of the clarity, especially where higher amounts of dextran are used, although the settlement rate may be somewhat reduced at the same time.

EXAMPLE 6

In order to investigate the effect of varying the amount of carbonate which contributes to the alkalinity tests were carried out by using slurries made up with constant total alkalinity (210 g/l measured as sodium hydroxide) but with differing amounts of sodium hydroxide and sodium carbonate contributing to the alkalinity. Where a combination of flocculant components is used the dextran is added first. The results are shown in Table 6.

TABLE 6

| NaOH g/l | Na₂CO₃ g/l | Dextran mg/l | PSA mg/l | Settlement Rate cm/min | Clarity |
| --- | --- | --- | --- | --- | --- |
| 200 | 13 | — | 2 | 40* | 10 |
| 200 | 13 | — | 3 | 76 | 15 |
| 200 | 13 | — | 4 | 90 | 15 |
| 200 | 13 | 1.0 | 3 | 85 | 35 |
| 200 | 13 | 1.5 | 3 | 93 | 38 |
| 200 | 13 | 2.0 | 3 | 96 | 40 |
| 180 | 40 | — | 2 | 21* | 6 |
| 180 | 40 | — | 3 | 44* | 6 |
| 180 | 40 | — | 4 | 50* | 7 |
| 180 | 40 | 1.0 | 3 | 77 | 15 |
| 180 | 40 | 1.5 | 3 | 78 | 20 |
| 180 | 40 | 2.0 | 3 | 94 | 23 |
| 160 | 66 | — | 2 | 14* | 5 |
| 160 | 66 | — | 3 | * | 5 |
| 160 | 66 | — | 4 | * | 5 |

TABLE 6-continued

| NaOH g/l | Na2CO3 g/l | Dextran mg/l | PSA mg/l | Settlement Rate cm/min | Clarity |
|---|---|---|---|---|---|
| 160 | 66 | 1.0 | 3 | 54 | 9 |
| 160 | 66 | 1.5 | 3 | 56 | 12 |
| 160 | 66 | 2.0 | 3 | 69 | 14 |

*Indistinct mud line

The results show that for slurries which have a very high carbonate content the use of synthetic polymer alone cannot achieve satisfactory flocculation. The incorporation of dextran improves settlement rate and clarity even in those slurries.

EXAMPLE 7

Example 6 was repeated but varying the total alkalinity by maintaining the sodium hydroxide concentration constant (at the two levels indicated) and varying the amount of sodium carbonate used. The results are shown in Table 7.

TABLE 7

| NaOH g/l | Na2CO3 g/l | Dextran mg/l | PSA mg/l | Settlement Rate cm/min | Clarity |
|---|---|---|---|---|---|
| 150 | 50 | — | 3 | 67 | 8 |
|  | 50 | 1 | 3 | 64 | 14 |
|  | 55 | — | 3 | 49 | 6 |
|  | 55 | 1 | 3 | 69 | 13 |
|  | 60 | — | 3 | * | 5 |
|  | 60 | 1 | 3 | 68 | 12 |
|  | 65 | — | 3 | * | 4 |
|  | 65 | 1 | 3 | 56 | 9 |
| 128.5 | 28 | — | 3 | 91 | 32 |
|  | 28 | 1.5 | 3 | 125 | 46 |
|  | 48 | — | 3 | 67 | 16 |
|  | 48 | 1.5 | 3 | 83 | 42 |
|  | 68 | — | 3 | 47* | 11 |
|  | 68 | 1.5 | 3 | 70 | 30 |
|  | 88 | — | 3 | 30* | 6 |
|  | 88 | 1.5 | 3 | 77 | 24 |
|  | 108 | — | 3 | * | 5 |
|  | 108 | 1.5 | 3 | 50 | 10 |

*Indistinct mud line

The results show again that for the high carbonate slurries where synthetic polymer alone gives inadequate flocculation the use of a combination with dextran gives satisfactory settlement rates and clarity.

EXAMPLE 8

The procedure of example 3 was repeated, using the same slurry as in example 3 but using in place of dextran a range of other polysaccharides including many that have been used or suggested for use as flocculants in the Bayer process. In each test the polysaccharide was added first and mixed into the slurry and then 3 mg/l PSA was added and mixed. The polysaccharides were used in amounts up to 50 mg/l but none gave satisfactory clarities. The materials tested were low and high molecular weight white and yellow dextrans, cationic and anionic starches, alginate, carboxy methyl cellulose, hydroxyethyl cellulose, amylopectin(waxy maize starch), amylose and guar gum.

We claim:

1. In a process in which bauxite is digested in an aqueous alkaline liquor and the resultant red mud is flocculated with a flocculating agent and separated from the digestion liquor in a primary separation stage, the overflow liquor of the primary separation stage is optionally subjected to a secondary clarification stage in which suspended red mud particles are flocculated and separated from the liquor, and the red mud from the said primary separation stage and optional secondary clarification stage is then washed in a plurality of sequential wash stages in each of which the mud is washed with a wash liquor, flocculated with a flocculating agent and separated from the wash liquor, and the flocculating agent in at least one stage selected from the said primary separation stage, secondary clarification stage and the wash stages comprises a synthetic anionic polymeric flocculant, the improvement wherein the flocculating agent further comprises at least about 0.02 mg/l of a dextran having a molecular weight of at least about 500,000, wherein said synthetic anionic polymeric flocculant has a molecular weight of at least about 0.5 million, and is a water soluble polymer formed from 40-100% anionic monomer and 60-0% non-ionic monomer, and wherein the anionic monomer is selected from the group consisting of (meth) acrylic acid, (meth) allylsulfonic acid, vinyl sulfonic acid and 2-acrylamido-2-methyl propane sulfonic acid.

2. The improvement according to claim 1 in which the dextran is added to the liquor prior to addition of the synthetic anionic polymeric flocculant.

3. The improvement according to claim 1 in which the said at least one stage is the primary settlement stage.

4. The improvement according to claim 1 in which the dextran has a molecular weight in the range 500,000 to 10 million.

5. The improvement according to claim 1 in which dextran is added in an amount in the range 0.2 to 10 mg/l.

6. The improvement according to claim 1 in which dextran is added in an amount in the range 0.5 to 5 mg/l.

7. The improvement according to claim 1 in which the anionic polymeric flocculant is added in an amount in the range 0.5 to 20 mg/l.

8. The improvement according to claim 1 in which the anionic polymeric flocculant is added in an amount in the range 1 to 10 mg/l.

9. The improvement according to claim 1 in which the liquor in said stage has a sodium carbonate content of at least 10 g/l.

10. The improvement according to claim 1 in which the liquor in said stage has a sodium carbonate content of at least 20 g/l.

11. The improvement according to claim 1 in which the liquor in said stage has a sodium carbonate content of at least 50 g/l.

12. The improvement according to claim 1 in which the amount of synthetic anionic polymeric flocculant is greater than the amount of dextran.

13. The improvement according to claim 1 in which the anionic flocculant is 1-10 mg/l of a polymer formed from 40-100% acrylic acid and 60-0% acrylamide, and wherein 0.5-5 mg/l dextran is added to the aqueous liquor before the said addition of polymer.

14. The improvement according to claim 13 in which the treated liquor is the primary settlement liquor.

15. In a process in which bauxite is digested in an aqueous alkaline liquor and the resultant red mud is flocculated with a flocculating agent and separated from the digestion liquor in a primary separation stage, the overflow liquor of which is optionally subjected to a secondary clarification stage in which ,further suspended red mud particles are flocculated and separated from the liquor, and the red mud from the primary separation stage and, if present, optionally also the secondary clarification stage is then washed in a plurality of sequential wash stages in each of which the mud is washed with a wash liquor, flocculated with a flocculating agent, and separated from the wash liquor, the improvement wherein the flocculating agent in at least one stage selected from the primary separation stage, secondary clarification stage and the wash stages comprises a first addition of 0.5 to 5 mg/l dextran having a molecular weight of at least about 500,000, and a second addition of 0.1 to 10 mg/l of a polymer formed from 40 to 100% acrylic acid and 60to 0% acrylamide having a molecular weight of at least about 0.5 million.

* * * * *